United States Patent [19]
Peterson

[11] 4,339,858
[45] Jul. 20, 1982

[54] DAMPENER ROLL COVER

[75] Inventor: Stanley G. Peterson, Minneapolis, Minn.

[73] Assignee: Minnesota Mining and Manufacturing Company, St. Paul, Minn.

[21] Appl. No.: 203,233

[22] Filed: Nov. 3, 1980

[51] Int. Cl.[3] .......................... B21B 31/08; B60B 7/02

[52] U.S. Cl. ...................................... 29/131; 29/129.5; 29/132

[58] Field of Search ....................... 29/123, 129.5, 131, 29/132

[56] References Cited

U.S. PATENT DOCUMENTS

| | | | |
|---|---|---|---|
| 2,480,173 | 8/1949 | Wilson | 29/131 UX |
| 2,625,735 | 1/1953 | Hiton | 29/131 UX |
| 2,755,516 | 7/1956 | Adams et al. | 29/131 UX |
| 3,152,387 | 10/1964 | Macleod | 29/129.5 X |
| 3,180,115 | 4/1965 | Marshall | 66/170 |
| 3,229,351 | 1/1966 | Peterson et al. | 29/129.5 |
| 3,293,097 | 12/1966 | Peterson et al. | 156/191 |
| 3,568,286 | 3/1971 | Ross | 29/129.5 X |
| 4,028,786 | 6/1977 | Dempster | 29/132 |
| 4,043,142 | 8/1977 | Marshall | 66/170 |
| 4,144,812 | 3/1977 | Julian | 101/382 |
| 4,144,813 | 3/1979 | Julian | 29/129.5 X |

*Primary Examiner*—Wayne L. Shedd
*Attorney, Agent, or Firm*—Cruzan Alexander; Donald M. Sell; Walter N. Kirn

[57] ABSTRACT

A printing dampening roll cover of composite construction having an inner textile fabric layer and an outer non-woven layer, the two layers being concentrically disposed and bonded at the interface to form a water-permeable, integral structure which can be expanded for ready placement on the dampener roll and shrunk in situ to fit snugly on the roll during use.

12 Claims, 2 Drawing Figures

DAMPENER ROLL COVER

DESCRIPTION

1. Technical Field

This invention relates to covers for dampener rolls used in printing, particularly lithography. While the covers are preferably employed as ductor roll covers, and it is in that context that the invention will be principally described, it is to be understood that the covers may be suited to other types of dampener rolls, e.g., water form rolls, involved in the transfer of aqueous dampening solution to the printing plate surface.

2. Background Art

Lithographic printing entails applying aqueous dampening solutions to a printing plate to cover the background areas of the plate followed by application of oil-based inks to those areas of the plate which are to serve as the image areas. As will be better understood from the following detailed description of the invention, the aqueous solutions are generally transmitted from a source to the printing plate by a train or series of rolls, including a ductor roll and a water form roll. The object is to apply a uniform, continuous, clean ample film of aqueous solution to the background areas of the printing plate over the duration of the printing cycle in as economical, efficient manner as possible. There are several hurdles to overcome in achieving this multifaceted objective, which involves many inherently antagonistic demands.

The demand for efficiency and economy begins with providing a replaceable surface for the roll, as an integral roll would generally be too costly. The replaceable surface, in the form of a roll cover, should be dimensioned to be readily applied to the roll, and thereafter be capable of fitting snugly on the roll in the presence of rotational and other distortional forces generated during operation. This fitting and gripping problem has been addressed in the prior art, typical of which is the discussion in U.S. Pat. No. 3,180,115. In this patent, roll covers incorporating elastic yarns are described to obviate the shortcomings of the many secondary anchoring means such as adhesives, end-ties and the like which have been previously adopted. A related improvement in elastic dampener roll covers is described in U.S. Pat. No. 4,043,142.

A continuous, uniform aqueous dampening film is essential to achieving quality printing. Discontinuities or patterns in the film can be caused by irregularities in the cover surface, resulting from the basic design of the cover (e.g., see the discussion in U.S. Pat. No. 4,043,142 of the elastic cover which is the subject of U.S. Pat. No. 3,180,115) or from distortion or wear of the cover during use. Thus, the cover must be free of inherent irregularities in initial design and have uniform wearing qualities to preclude introducing irregularities in use. Additionally, the cover should have sufficient structural integrity to withstand distortive forces generated in use. Roll covers composed of napped, loosely woven cotton material called molleton present problems in nonuniformity due to the presence of the napped fibers. The fibers tend to compress with time necessitating a running in period to get a steady state where uniformity is achievable.

Insofar as providing a clean dampening film there are at least two considerations to the selection of a dampener roll cover. First, the roll cover may be a source of contaminants in the form of lint or loosened fibers. Deposition of lint or loose fibers on the printing plate in the course of dampening application interferes with the subsequent application of ink to the plate with a consequent loss in print quality. The second condieration involves contamination of the roll cover with ink, and the ability to remove the ink from the cover. After a period of press running a slight, but significant, amount of ink works its way back on the fountain train and deposits itself on the ductor roll cover. The ease with which the roll covering may be cleaned of ink is an important criterion in measuring the utility of the cover. For example, when a molleton roll becomes dirty with ink residue, the entire roller assembly must be disengaged and the surface scoured in a separate cleaning bath. The removal and substitution of molleton covers must also take place when changing the color of the ink as is frequently required on single color presses. The covering that is the subject of this invention can be cleaned on press and does not require substituting for changes in the color of the ink.

The ability to provide an ample quantity of aqueous dampening solution relates to the liquid retention properties of the roll cover. Even though the actual source of liquid is contained in the fountain tray, yet the degree of control for wetting the background surface of the printing plate resides in the effective functioning of the ductor roll. For this reason, a covering for the roll must have the ability to absorb moisture from the fountain roll, to retain sufficient moisture to satisfy the demand and to release controlled amounts of fluid so that the water form roll is sufficiently supplied.

DISCLOSURE OF INVENTION

The foregoing objectives are met by the present invention defined as a cylindrical shaped article of substantially uniform cross-sectional dimension having inner and outer concentrically positioned layers, said inner layer comprising a water wickable textile fabric and said outer layer comprising a porous, smooth, continuous surfaced, water-permeable, hygroscopic, cohesive, nonwoven member of hydrophilic randomly disposed fibers, bonding means for bonding said inner layer to said outer layer along the interface of said inner and outer layers, said cylindrical article having a first radial dimension when dry, a second radial dimension when wetted in the presence of a radially expansive force, said second radial dimension being greater than said first radial dimension, said article being capable of retaining said second radial dimension upon drying, and a third radial dimension upon rewetting, said third radial dimension being smaller than said second radial dimension.

The outer layer as defined above is currently employed as a dampener roll cover, particularly a water form roll cover, and is particularly described in U.S. Pat. Nos. 3,229,351 and 3,293,097. While this structure meets the requirements for a water form cover, it lacks sufficient water holding capacity and water permeability to serve as a ductor roll cover. This deficiency is supplied by the inclusion of the inner layer. As will be explained further, the inner and outer concentrically disposed layers are bonded at their interface (the contiguous surfaces) to form an integral, water permeable composite structure.

BRIEF DESCRIPTION OF THE DRAWINGS

Further explanation of the invention is provided by reference to the accompanying drawings wherein.

DETAILED DESCRIPTION

Figure 1:
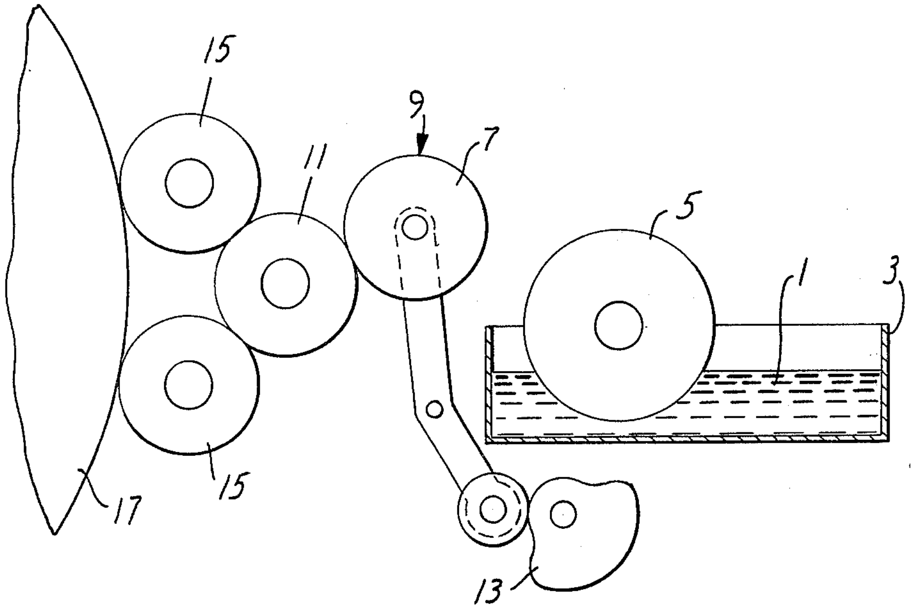
FIG. 1 is a schematic diagram showing the dampening system in a typical lithographic printing press.

Referring to FIG. 1, aqueous dampener 1 contained in tray 3 is picked up by fountain roll 5 and transferred to the ductor roll 7 equipped with cover 9 by momentary contact between these two rolls 5 and 7. Reciprocal movement of ductor roll 7 between fountain roll 5 and vibrator roll 11 is controlled by a camming mechanism 13. Aqueous dampening fluid is transferred from the cover 9 of the ductor roll 7 to vibrator roll 11, thence to water form rolls 15 and finally to the surface of printing plate 17.

Figure 2:
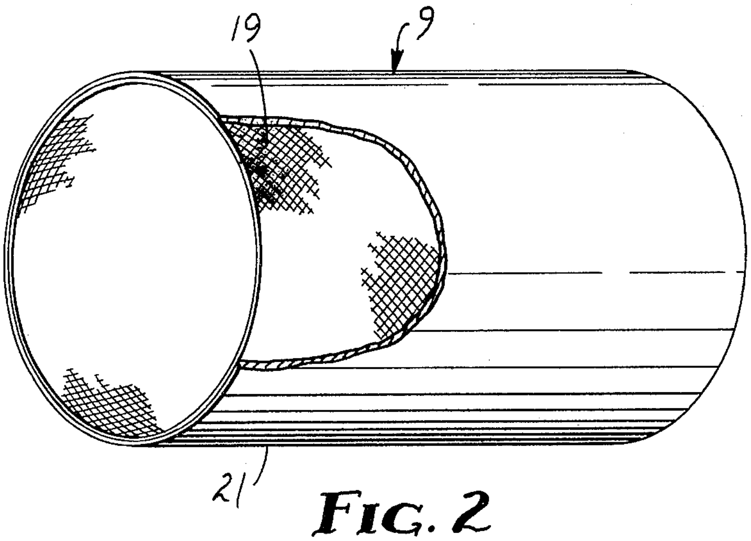
FIG. 2 is a perspective view of the roll cover of the present invention with portions removed to show underlying structure.

FIG. 2 illustrates details of the self-supporting cylindrical-shaped roll cover 9. It includes an inner concentric layer 19 in the form of a sleeve of a textile fabric bonded continuously over its outer surface to an outer concentric layer 21 in the form of a sleeve of non-woven material.

Inner layer 19 is a textile fabric composed of water absorbing, natural or synthetic fibers exemplary of which are cotton and polyester. Among the common textile manufacturing processes, i.e., knitting, braiding, weaving, the former is the preferred means of constructing inner layer 19 due at least in part to radial expansibility of knitted fabrics. The pattern of the inner layer fabric, i.e., the spatial relationship of the yarns, may influence the results achieved by the cover in at least two respects. First, the pattern influences the water pick up and retention capabilities of the cover. Within bounds a more open pattern will permit greater water pick up and retention than a tighter, closed pattern. The tightness with which the individual yarns are wound also makes a difference—looser yarns providing a greater space for water pick up and retention. On the other hand, as a general rule the larger the open spaces, the greater is the likelihood that the textile fabric will contribute unevenness to the cover and thus introduce a pattern to the dampening solution laydown. Selecting the appropriate textile pattern to obtain adequate water or dampening solution pick up and retention without introducing undesirable patterning is within the skill of the art given the criteria herein discuss.

The non-woven outer layer 21 of the cover 9 is generally described in terms of both structure and method of manufacture in my U.S. Pat. Nos. 3,293,097 and 3,229,351 incorporated herein by reference. These patents disclose the use of non-woven fibers that can be processed in a novel fashion for use as dampening roll covers. As mentioned previously, the form roll cover described in these patents would find marginal utility in the ductor position on lithographic presses because of the lack of water carrying capacity. The non-woven outer sleeve also lacks water transmissibility when manufactured alone in the absence of the inner textile fabric. This appears due to the method of forming the cover which entails forming the cover on a heated metal mandrel in the presence of moisture. This causes a partial solubilization of the polyvinyl alcohol fibers as well as the binder resulting in migration of the polyvinyl alcohol or other moisture soluble fibers if present to the mandrel/cover interface and consequent formation of a moisture impermeable boundary layer.

When the textile fabric sleeve which constitutes the inner layer is placed next to the mandrel and the wet, non-woven outer layer is wound over the inner layer, the forming operation also results in a migration of the polyvinyl alcohol to the interface. However, the textile character of the inner layer prevents an impermeable layer from forming while still providing the bond necessary to join the two structures. It is this lack of a continuous, impermeable bonding layer at the inner layer/outer layer interface that permits moisture from the dampening solution to permeate this interface and saturate the textile fabric inner layer and thereafter be supplied to the outer layer upon demand.

As described in U.S. Pat. No. 3,229,351, outer layer 27 of cover 9 constitutes a seamless, cohesive, porous, hygroscopic, non-woven cylindrical structure having a uniform surface texture. The fibers of the outer layer are comprised of hydrophilic, randomly disposed fibers which (1) are substantially water insoluble at temperatures below about 100° F., preferably below 170° F., (2) can be longitudinally expanded, preferably at least 3%, when water wetted, (3) have dimensional stability when dry, and (4) longitudinally contract from their expanded state when water wetted.

Non-woven webs and fabrics of a wide variety of materials are well known, and the preparation or selection of appropriate non-woven webs or fabrics containing fibers with the aforementioned properties can readily be determined by those skilled in the art.

The non-woven web may be composed of a single or multiple layer of non-woven material. By using a hydrophilic fiber and/or a resin which is heat fusible or heat and moisture fusible in conjunction with the other hydrophilic fibers in the non-woven web, several layers of the web may be bonded together by the application of either heat alone or heat and moisture while subjecting the several layers to pressure in a suitable device. The particular conditions of heat, moisture and pressure depend, of course, on the fibers or resins employed. Preferably, the pressure should be sufficient to compress the several layers to about 20 percent of their original combined thickness.

A particularly preferred class of hydrophilic fibers for the non-woven web are the polyvinyl alcohol fibers, especially those polyvinyl alcohol fibers with a denier from about 0.5 to about 6 and an individual average fiber length of from 0.5 cm. to about 6 cm. (preferably 1 cm. to 4 cm.). Polyvinyl alcohol fibers are available in various grades, depending on their solubility characteristics in hot water. Other useful heat fusible fibers, i.e., fibers capable of being cohered or bonded to each other upon application of heat and pressure with or without the presence of moisture, include the polypyrrolidone fibers. In general, the inclusion of additional hydrophilic fibers, not necessarily heat fusible, in the non-woven web is preferred. Fibers such as cotton, regenerated cellulose, viscose rayon, cellulose acetate rayon and other rayons may thus also be incorporated to modify the properties of the non-woven web and hence of the sleeve, e.g. to increase strength and hydrogroscopic properties. Saponified cellulose acetate fibers, particularly those in which cellulose acetate fibers are saponified in their oriented condition during manufacture and having a denier from about 0.5 to about 3 and an average fiber length of from about 0.64 cm. to about 5.1 cm.

(preferably 1.3 cm. to 3.81 cm.), in combination with at least 20 weight percent of polyvinyl alcohol fibers, provide a non-woven material having outstanding properties when used as a ductor roll cover outer layer in accordance with this invention. Occasionally, it is found that a small amount of binder, e.g., a water soluble polyvinyl alcohol resin, may be applied to the dry fibers in the preparation of the non-woven material to assist in bonding the fibers together in a cohesive web. Usually a maximum of about 5 weight percent, preferably less than about 2 weight percent, of the non-woven web is binder, particularly when the more water soluble binders are employed. The preparation of non-woven webs from dry fibers, either with or without additional binder materials, may be carried out by conventional means, e.g., a Rando-Webber machine. Non-woven webs of 30–40 mils maximum thickness are generally most useful.

A preferred example of a non-woven layer employs 49% by weight of polyvinyl alcohol fibers with a denier of about 1.5 and an individual fiber length of 1 9/16 inches (3.96 cm.). A preferred commercially available example of such hydrophilic fibrous material is that sold under the trade name Kuralon VPB101, a non-heat treated fiber. Mixed with this polyvinyl alcohol fiber is 51% by weight of a 1.7 denier by 1 9/16 inch (3.96 cm.) long rayon fiber manufactured by American Enka under the trade name Fiber 700. The polyvinyl alcohol fibers can vary from 46 to 52 percent by weight for optimum properties.

A bonding solution used to further tie the non-woven outer layer together during manufacture and to contribute as an anchoring source for the inner textile fabric layer consists of the following composition:

2.5% polyvinyl alcohol, available under the trade name DuPont Elvanol 71-30G
35% methyl alcohol
62.5% water The total polyvinyl alcohol content of the non-woven web, including bonding solution, ranges from 47 to 53%.

Construction of the composite roll cover involves slipping the inner sleeve such as a tubular knitted cotton fabric having a count of 14×16 over a steel mandrel whose diameter is chosen so that the sleeve is under a slight radial expansion when mounted in place. Over this sleeve is placed three wraps of water-saturated non-woven web, described above, the leading edge of which is immediately below the trailing edge of the web so that no ridging occurs in the curing process. A wetted curing tape, i.e., a tape which shrinks upon drying, such as the nylon cure tape commonly used in the manufacture of rubber rolls, is wrapped tightly about the mandrel over the multiple layers of non-woven web. The knitted fabric inner sleeve and the non-woven web are then heated by means of steam at about 100 psi gauge passing through the inner, hollow portions of the mandrel. At least partial solubilization of the non-woven fibers and of the interface between the knitted fabric inner sleeve and the outer web takes place at a temperature above 300° F., producing a cohesive cover. As the bonding occurs, the layers of non-woven web and also the knit fabric are simultaneously placed under radial compression due to the contraction of the cure tape. In general, a compression of at least 50% of the original thickness of the non-woven layers is preferred to obtain a high density product, although the amount of compression may vary widely depending on the original density of the non-woven web. After drying, the cure tape is removed and the exposed exterior surface of the cover is sanded to remove irregularities. The formed sleeve is wetted with water, slipped over an expandable mandrel, expanded pneumatically at least about 6%, preferably about 9%, and dried in its expanded state.

The dry cover is then slipped over a ductor roll and upon moistening the cover contracts to the dimensions of the roll and tightly adheres to its surface. It is an essential property of the cover of this invention that it be capable of at least about 6% radial expansion in its wetted condition in the presence of an expansive force from a first radial dimension to a second radial dimension; that it retain its expanded radial dimension after drying, and that it contract at least about 3% from the second radial dimension to a third radial dimension upon rewetting in the absence of such expansive force. The expansion and contraction referred to herein is an inside dimension, i.e., from the center of the cylinder to the proximate surface of the inside layer.

The invention is further illustrated by the following examples wherein parts and percentages are by weight unless otherwise stated.

EXAMPLE I

A tubular knitted cotton fabric 1.8 inches (4.572 cm.) in diameter is chosen to fit a Miehle 29 press whose ductor roll measures 2.235 inches (5.677 cm.) outside diameter. The fabric composition consists of a knit containing a yarn count of 14 wales and 16 courses per square inch and thread consisting of 3–15 singles knitted as a single yarn. The weight of this specimen is approximately 1.9 ounces per lineal yard.

The cotton sleeve is slipped over a hollow steel mandrel measuring 2.108 inches (5.354 cm.) in diameter and then wrapped with three layers of a 70 lb. basis weight non-woven web containing 49% polyvinyl alcohol (1.7 denier and 1 9/16 inches (3.96 cm.) in length) and 51% rayon fibers. This composite structure is then wrapped with wet nylon cure tape and the mandrel heated internally for five minutes with 90 p.s.i.g. steam. The tape is removed from the specimen and the outer surface of the non-woven fabric is sanded with a 100 grit sandpaper to remove any evidence of a pattern left by the cure tape.

The ductor roll cover is then wetted and slipped over a pneumatically expanding mandrel and the diameter enlarged 9%. The cover is then dried in this expanded state and allowed to stabilize.

Following this procedure, the cover is mounted on a Miehle 29 ductor roller and shrunk to a tight fit by wetting its entire surface with water. Installed on a press, the cover ran on a daily basis for over four weeks without need for cleaning or adjustment. At the end of the test cycle the outer layer of non-woven fabric showed no evidence of shredding or wrinkling.

Following the procedures outlined in A.S.T.M. testing designation D412-64T, measurements were made of the effect of a tension load on the composite structure at room temperature compared to a sleeve of the same composition but containing no inner knit fabric, i.e., a sleeve fabricated according to U.S. Pat. No. 3,293,097.

Using an Instron testing machine and following the procedures outlined for the testing of ring specimens, at a 5.5% elongation the wet ductor roll cover showed a 25% increase in strength when compared to the specimen containing no inner tubular knit fabric. The 5.5% elongation represents the percentage difference between the ductor roller (2.235 inches (5.677 cm.) in diameter) and the cover as formed on the mandrel (2.108 inches (5.357 cm.) in diameter).

The difference in water absorption between the unitary composite cover of this invention and the outer non-woven sleeve and inner tubular knit fabric individually and in juxtaposed, unbonded relationship is determined as follows. A 2 inch (5.1 cm.) long specimen of the cover described above is selected. A rubber bladder is located along the axis of the specimen and then expanded pneumatically so that a tight contact is made with the inner surface of the ductor roll specimen. In this state moisture absorbed from the outer surface of the cover is transferred through the cover but excess water can not accumulate on the inner surface and thus invalidate the moisture pick-up measurements.

The specimen so prepared is first weighed under normal humidity conditions, then immersed in water for 30 seconds and the test repeated at a two minute interval. After 30 seconds, 6.61 grams of moisture is absorbed by the composite sample representing a 134.1% pick-up over dry weight. A two minute immersion shows 5.86 grams pick-up and an increase of 138.3% over dry weight.

By contrast a shell composed of the non-woven outer layer only gives a weight pick-up of 1.59 grams or an increase of 63.5% over dry weight after 30 seconds immersion, and a 2.04 increase or 71.2% over dry weight after two minutes of immersion in water. The cotton knit inner layer along provides a 139.1% weight increase over its dry weight when tested without the non-woven outer cover.

Finally, the weight increase of the inner cotton knit layer/outer non-woven layer combination in juxtaposed, unbonded relationship is only 38.4% over the dry weight basis for a 30 second immersion and 56.1% after a two minute immersion. Neglecting the weight of the inner knit sleeve, the percentage weight pick ups are 67.3% and 93.8%—essentially the same figures found for the pickup of the outer non-woven sleeve alone. The relative non-absorptability of the unbonded combination is believed due to a water barrier formed at inner surface of the non-woven layer when manufactured alone as previously explained.

EXAMPLE 2

A non-woven outer layer of the construction described in Example 1 is provided. An inner, tubular, knit fabric of spun polyester is substituted for the cotton knit exemplified above. This polyester knit is composed of a mesh having 14 wales by 16 courses per square inch and weighs 1.25 ounces/lineal yard at an inside diameter of 1.8 inches (4.572 cm.). The yarn is composed of two—9 singles knitted as one. This cover prepared as described in Example 1 exhibits a range of moisture pick-up similar to that exhibited by the cover of Example 1.

EXAMPLE 3

A cover as described in Example 1 is prepared for use on an ATF Chief 15 duplicator size press. The cover is placed on the water form roll and a comparison made between such a cover and a cover composed solely of the non-woven outer layer of Example 1. It is observed that this latter cover dries out to the touch in 15 minutes. In commerce, such a drying cycle would require the sleeve to be rewetted prior to the recommencement of the printing operation to prevent dirty copy on start-up. By contrast, a cover made according to Example 1 remains damp after four hours of press shut down and thus prints clean copy without any indication of ink residue in the background of the printed sheets.

I claim:

1. A cylindrical shaped article of substantially uniform cross-sectional dimension having inner and outer concentrically positioned layers, said inner layer comprising a water wickable textile fabric, and said outer layer comprising a porous, smooth, continuous surfaced, hygroscopic, cohesive, non-woven member of hydrophilic randomly disposed fibers, bonding means for bonding said inner layer to said outer layer along the interface of said inner and outer layers, said cylindrical article having a first radial dimension when dry, a second radial dimension when wetted in the presence of a radially expansive force, said second radial dimension being greater than said first radial dimension, said article being capable of retaining said second radial dimension upon drying, and a third radial dimension upon rewetting, said third radial dimension being smaller than said second radial dimension.

2. The article of claim 1 wherein said textile fabric is knitted.

3. The article of claim 1 wherein said textile fabric is woven.

4. The article of claim 1 wherein said textile fabric is a tubular braid.

5. The article of claim 1 wherein both said inner and outer layers are seamless.

6. The article of claim 1 wherein said second radial dimension is at least about 6% greater than said first radial dimension and said third radial dimension is at least about 3% less than said second radial dimension.

7. The article of claim 1 wherein said textile fabric is cotton knit.

8. The article of claim 1 wherein said hydrophilic fibers of said outer layer comprise polyvinyl alcohol fibers and rayon fibers.

9. The article of claim 1 wherein said inner layer comprises a polyester knit.

10. The article of claim 1 wherein said hydrophilic fibers are substantially water insoluble below about 100° F., are longitudinally expandable when water wetted.

11. The article of claim 1 wherein said non-woven layer comprises at least about 40 weight percent polyvinyl alcohol fibers and at least about 40 weight percent rayon fibers and said textile fabric comprises cotton knit.

12. The article of claim 1 wherein said interface is water permeable.

* * * * *